United States Patent
Kaspar et al.

(10) Patent No.: US 6,864,336 B2
(45) Date of Patent: Mar. 8, 2005

(54) FLUOROELASTOMERS HAVING LOW TEMPERATURE CHARACTERISTICS AND SOLVENT RESISTANCE

(75) Inventors: Harald Kaspar, Burgkirchen (DE); Klaus Hintzer, Kastl (DE); Guy van Gool, Melsele (BE); Franz März, Burgkirchen (DE); Allan T. Worm, North St. Paul, MN (US); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

(21) Appl. No.: 10/660,437

(22) Filed: Sep. 11, 2003

(65) Prior Publication Data

US 2004/0127661 A1 Jul. 1, 2004

Related U.S. Application Data

(60) Provisional application No. 60/410,225, filed on Sep. 12, 2002.

(51) Int. Cl.$^7$ .............................................. C08F 214/22
(52) U.S. Cl. ........................ 526/255; 526/242; 526/247; 526/250
(58) Field of Search ................................ 526/255, 242, 526/247, 250

(56) References Cited

U.S. PATENT DOCUMENTS

| | | | |
|---|---|---|---|
| 2,567,011 A | 9/1951 | Diesslin et al. | |
| 2,732,398 A | 1/1956 | Brice et al. | |
| 2,809,990 A | 10/1957 | Brown | |
| 4,000,356 A | 12/1976 | Weisgerber et al. | |
| 4,214,060 A | 7/1980 | Apotheker et al. | |
| 4,368,308 A | 1/1983 | Yamabe et al. | |
| 4,418,186 A | 11/1983 | Yamabe et al. | |
| 4,501,869 A | 2/1985 | Tatemoto et al. | |
| 4,529,784 A | 7/1985 | Finlay | |
| 4,687,821 A | 8/1987 | Ezzell et al. | |
| 4,745,165 A | 5/1988 | Arcella et al. | |
| 4,831,085 A | 5/1989 | Okabe et al. | |
| 5,173,553 A | * 12/1992 | Albano et al. | 526/238 |
| 5,260,393 A | * 11/1993 | Arcella et al. | 526/247 |
| 5,349,093 A | * 9/1994 | Oka et al. | 568/615 |
| 5,696,216 A | * 12/1997 | Kruger et al. | 526/247 |
| 5,891,974 A | * 4/1999 | Saito et al. | 526/247 |
| 6,380,337 B2 | * 4/2002 | Abe et al. | 526/255 |
| 6,610,807 B2 | * 8/2003 | Duchesne et al. | 526/250 |
| 2001/0008922 A1 | 7/2001 | Abe et al. | |

FOREIGN PATENT DOCUMENTS

| | | |
|---|---|---|
| EP | 0 077 998 A2 | 5/1983 |
| EP | 0 407 937 B1 | 1/1991 |
| EP | 0 219 065 B1 | 3/1992 |
| EP | 0 661 304 A1 | 7/1995 |
| EP | 0 761 735 B1 | 3/1997 |
| EP | 0 769 521 A1 | 4/1997 |
| EP | 0 784 064 A1 | 7/1997 |
| EP | 0 834 521 A1 | 4/1998 |
| EP | 1 148 072 A2 | 10/2001 |
| EP | 1 160 258 A1 | 12/2001 |
| JP | 2002-114824 | 4/2002 |
| WO | WO 93/22379 | 11/1993 |
| WO | WO 96/24622 | 8/1996 |
| WO | WO 97/17381 | 5/1997 |
| WO | WO 98/14517 | 4/1998 |
| WO | WO 98/58984 | 12/1998 |
| WO | WO 01/49752 A2 | 7/2001 |
| WO | WO 02/44265 A2 | 6/2002 |

OTHER PUBLICATIONS

*Encyclopedia of Polymer Science and Engineering*, Second Edition, V. 15, "Silicones", pp. 204–308, John Wiley & Sons, 1989.

*Journal of American Chemical Society*, V. 116, (1994), "Reactivity of Fluorinated Alkyl Radicals in Solution. Some Absolute Rates of Hydrogen–Atom Abstraction and Cyclization", pp. 4521–4522.

*Zhurnal Organicheskoi Khimii*, vol. 9, No. 2, pp. 225–228, Feb. 1973, "The Reactivity of Polyfluorinated Unsaturated Compounds With Respect To The Methyl Radical", (translation), S. V. Lebedev, Scientific–Research Institute of Synthetic Rubber.

* cited by examiner

*Primary Examiner*—Tatyana Zalukaeva
*Assistant Examiner*—Henry S. Hu
(74) *Attorney, Agent, or Firm*—Brian E. Szymanski

(57) ABSTRACT

The present invention is based on quad-fluoropolymer suitable for the preparation of a fluoroelastomer. The fluoropolymer comprises repeating units derived from 10 to 40 mol % of tetrafluoroethylene, 40 to 65 mol % of vinylidene fluoride, 1 to 30 mol % of a perfluorinated vinyl ether of the formula $CF_2=CFOCF_2CF_2CF_2OCF_3$, 1 to 20 mol % of perfluoromethyl vinylether.

36 Claims, No Drawings

FLUOROELASTOMERS HAVING LOW TEMPERATURE CHARACTERISTICS AND SOLVENT RESISTANCE

CROSS REFERENCE TO RELATED APPLICATION

This application claims priority to U.S. Provisional Patent Application No. 60/410,225, filed Sep. 12, 2002.

FIELD OF THE INVENTION

The present invention relates to a fluoropolymer, a process for producing the fluoropolymer, and its fluoroelastomer composition having distinguished low temperature characteristics and improved solvent resistance.

BACKGROUND OF THE INVENTION

Fluoroelastomers with low glass transition temperatures are typically utilized as sealing material for low temperature applications. Most of the commercially available low temperature elastomers are copolymers or terpolymers based on VDF and/or TFE and perfluoromethyl vinylether (PMVE). PMVE is often selected as a comonomer due to its favorable copolymerization properties. Some conventional elastomers have glass transition temperatures ($T_g$'s) of around −30° C., but the solvent resistance (e.g. MeOH swell) is often sacrificed in order to obtain desirably low $T_g$'s.

To improve the solvent resistance, it is generally recognized within the art that a proportion of tetrafluoroethylene or perfluoro(alkyl vinyl ether) to be copolymerized should be increased. Further perfluoro(alkyl vinyl ethers) itself are expensive monomers and a cost increase of the fluoropolymer and fluoroelastomer products is inevitable by use of an increased amount of perfluoro(alkyl vinyl ethers).

Various approaches have been made to lower the $T_g$ of the fluoropolymers and fluoroelastomers while maintaining or improving other properties. Many of these approaches end up in unacceptable comonomer incorporation, extremely long polymerization run times (e.g. up to 17 hours), undesirable solvent resistance, and high comonomer costs.

U.S. Pat. No. 6,380,337 describes co- and quad-polymers comprising: 65 to 85 mol % VDF, 0.5 to 30 mol % perfluoromethoxypropyl vinyl ether (MV31), and optionally 0 to 10 mol % TFE and 0 to 25 mol % of a perfluorovinylether (preferably PMVE). The patent describes resulting elastomers with $T_g$'s of about −42° C. However, the resulting elastomers do not possess a desirably low solvent resistance over extended testing durations.

The present invention is directed to fluoropolymers and fluoroelastomers with a desirable balance between $T_g$, sufficient solvent swell (<60%) and an economical polymerization process.

SUMMARY OF THE INVENTION

The present invention is based on quad-fluoropolymer suitable for the preparation of a fluroelastomer. The fluoropolymer comprises repeating units derived from:

(a) 10 to 40 mol % of tetrafluoroethylene;
(b) 40 to 65 mol % of vinylidene fluoride;
(c) 1 to 30 mol % of a perfluorinated vinyl ether of the formula $CF_2=CFOCF_2CF_2CF_2OCF_3$; and
(d) 1 to 20 mol % of perfluoromethyl vinylether.

The fluoropolymer is generally referred to a quad-polymer due to the four main components. However, other comonomers, e.g., curesite comonomers, fillers, co-agents and conventionally recognized auxiliaries may be included in the fluorpolymer composition. For purposes of the invention the following terms are used synonymously:

Tetrafluoroethylene may be referred to as TFE;
Vinylidene fluoride may be referred to a VDF;
Perfluorinated vinyl ether of the formula $CF_2=CFOCF_2CF_2CF_2OCF_3$ may be referred to as MV31; and
Perfluoromethyl vinylether may be referred to as PMVE.

In a preferred aspect of the present invention the quad-polymer comprises more than 7 mol % of the MV31 (7 to 30 mol %), 10 to 40 mol % TFE, 40 to 65 mol % VDF and 1 to 15 mol % PMVE. Due to the high amounts of MV31, the liquid vinylether MV31 can only be efficiently incorporated into the polymers by using the so-called "pre-emulsification" technology. The vinylether is pre-emulsified into a water-based system containing non-telogenic fluoro-emulsifiers (such as APFO=perfluorooctanoic acid ammonium salt).

In another preferred aspect of the invention the quad-polymer comprises less than 7 mol % MV31 (1 to 7 mol %), 10 to 40 mol % TFE, 40 to 65 mol % VDF and 10 to 20 mol % PMVE. The MV31-amounts can be introduced into a kettle/polymerization system as a hot aerosol and avoiding pre-emulsification of the MV31. These systems can be polymerized without any fluoroemulsifiers.

In yet another preferred aspect, the above-mentioned quad-system can be polymerized as unimodal or as bi/multimodal fluoropolymers in respect to molecular weights. Bimodal or multimodal molecular weights may be desired in order to improve processing performance of the fluoropolymer in subsequent processing applications.

In a further aspect the above-mentioned polymers can be polymerized as core-shell materials, were at least 50% of the total weights have the above-mentioned quad-composition. Polymerization utilizing conventional core-shell materials are generally employed to enhance the efficiency of the polymerization process in order completely exhaust certain monomers, such as those that are relatively expensive.

The fluoropolymer has desirable physical characteristics relating to $T_g$ and solvent resistance. The $T_g$ is about −25° C. or lower and preferably −27° C. and lower. The solvent resistance, according to (include standard test reference for 168 hrs, 23° C. and FUEL K (CM85) solvent), of about 60% or less and preferably 50% or less.

The resulting fluoropolymer may be vulcanized using conventional methods to form a fluoroelastomeric compound.

DETAILED DESCRIPTION

The fluoropolymer suitable for preparing the fluoroelastomer comprises repeating units of 10 to 40 mol % TFE, preferably 15 to 35 mol %
40 to 65 mol % VDF, preferably 50 to 63 mol %
and either
7 to 30 mol % MV31, preferably 8 to 25 mol %,
1 to 15 mol % PMVE, preferably 2 to 12 mol %, most preferably 2–7 or alternatively
1 to 7 mol % MV31, preferably 1 to 6 mol %, most preferably 1–4 mol %
10 to 20 mol % PMVE, preferably 11 to 18 mol %

The fluoropolymer may further comprise brominated, iodinated units or both to ensure peroxide curing. In a typical peroxide cure system, the fluoropolymer is provided with one or more cure sites that comprise a halogen capable of participating in a peroxide cure reaction and the composition for providing the fluoropolymer contains an organic peroxide. The halogen capable of participating in a peroxide cure reaction is typically bromine or iodine and may be distributed along the fluoropolymer chain, contained in the end groups of the fluoropolymer or both. Typically, the amount of bromine or iodine contained in the fluoropolymer is between 0.001 and 5%, preferably between 0.01 and 2.5% by weight with respect to the total weight of the fluoropolymer. Chlorine is also capable of participating in a peroxide cure reaction of the fluoropolymer if an organic compound having a M-H functional groups, where M=Si, Ge, Sn, Pb. This approach is described in PCT patent application WO02/44265, herein incorporated by reference in its entirety. Accordingly, the fluoropolymers of this invention, which contain chlorine atoms by virtue of units deriving e.g. from CTFE, can be used for curing in a peroxide cure reaction. Of course the fluoropolymer may additionally be modified with bromine, iodine or both.

In addition to introducing chlorine by incorporating CTFE units, halogen atoms which are capable of participation in the peroxide cure reaction along the chain can be introduced by the copolymerization of the basic monomers of the fluoropolymer with a suitable fluorinated cure-site monomer (see for example U.S. Pat. Nos. 4,745,165, 4,831,085 and 4,214,060, herein incorporated by reference in their entirety). Such comonomer can be selected, for instance from:

(a) bromo- or iodo-(per)fluoroalkyl-perfluorovinylethers having the formula:

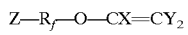

wherein X is for F or H, Y is F or H and Z is Br or I, $R_f$ is a (per)fluoroalkylene $C_1$–$C_{12}$, optionally containing chlorine and/or ether oxygen atoms; for example: $BrCF_2$—O—$CF=CF_2$, $BrCF_2CF_2$—O—$CF=CF_2$, $BrCF_2CF_2CF_2$—O—$CF=CF_2$, $CF_3CFBrCF_2$—O—$CF=CF_2$, and the like;

(b) bromo- or iodo (per)fluoroolefins such as those having the formula:

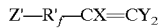

wherein X is for F or H, Y is F or H and Z' is Br or I, $R'_f$ is a (per)fluoroalkylene $C_1$–$C_{12}$ (which can be absent, or alternatively $R_f$ is H, X is F, Cl, H), optionally containing chlorine atoms; for instance: bromotrifluoroethylen, 4-bromo-perfluorobutene-1, and the like; or bromofluoroolefins such as 1-bromo-2,2-difluoroethylene and 4-bromo-3,3,4,4-tetrafluorobutene-1; and (c) non-fluorinated bromo-olefins such as vinyl bromide and 4-bromo-1-butene.

In replacement of, or in addition to, the cure site comonomer, the fluoropolymer can contain a cure site component in terminal position, deriving from a suitable chain transfer agent introduced in the reaction medium during the polymer preparation, as described in U.S. Pat. No. 4,501,869, herein incorporated by reference in its entirety. A terminal cure-site may also be derived from a suitable functional initiator. Examples of useful initiators include $X(CF_2)_nSO_2Na$ with n=1 to 10 (where X is Br or I) or an initiator composition comprising ammonium persulfate and potassium bromide. The chlorine of the $CF_2Cl$ end groups introduced when a chloride salt is present in the initiation of the free radical polymerization, can also participate in a peroxide cure reaction.

Examples of chain transfer agents include those having the formula $R_fBr_x$, $R_fI_x$, wherein $R_f$ is a X-valent fluoro-alkylradical $C_1$–$C_{12}$, optionally containing chlorine atoms, while X is 1 or 2. Additionally, chain transfer agents (CTA) of the general formula $RBr_nI_m$ wherein R represents a fluoro hydrocarbon, chlorofluoro hydrocarbon or a hydrocarbon and each of n and m is 0.1 or 2 can be used. Such CTAs are exemplified e.g. in U.S. Pat. No. 4,000,356 or U.S. Pat. No. 6,380,337 herein incorporated by reference in their entirety.

The polymerization can be performed in the presence of $I^-$/$Br^-$ salts (as described in EP 407 937) in order to introduce terminal Br or I endgroups.

In the fluoropolymer of the present invention the balance between TFE, MV31 and PMVE is selected to achieve desired low glass transition temperature properties, solvent resistance and the overall economics of the fluoropolymer. For example, higher TFE-content increases solvent resistance but often low-temperature characteristics may suffer. Preferably the TFE-content is not lower than 10%, more preferably not lower than 15%, otherwise the solvent resistant swell may increase to an unacceptable level. The content of MV31 determines effectively the $T_g$ but it is an expensive comonomer. Economic aspects therefore also determine the ratio of MV31. The total amount of MV31 and PMVE preferably sums to at least 13 mol %, otherwise the elastomer may become stiff or slightly crystalline, which makes the materials, especially the crosslinked materials, unattractive as fluoroelastomeric sealing materials. Most preferably the total content of MV31 and PMVE combines to provide at least 15 mol % to obtain a highly flexible elastomer.

The fluoropolymer suitable for curing to a fluoroelastomer is typically prepared by a free radical polymerization. The free radical polymerization is generally initiated through the use of free radical generating initiators. As initiators, one can use any of the known initiators commonly employed in the polymerization of fluorinated olefins such as tetrafluoroethylene. For example, peroxides can be used as free radical initiators. Specific examples of peroxide initiators include, hydrogen peroxide, tert-butylhydroperoxide, diacylperoxides such as diacetylperoxide, dipropionylperoxide, dibutylperoxide, dibenzoylperoxide, benzoylacetalperoxide, diglutaric acid peroxide and dilaurlyperoxide, and further water soluble per-acids and water soluble salts thereof such as e.g. ammonium, sodium or potassium salts. Examples of peracids include peracetic acid. Esters of the peracid can be used as well and examples thereof include tert-butylperoxyactete and tert-butylperoxypivalate.

Another class of initiators that can be used are water-soluble azo-compounds. Suitable redox systems for use as initiators include, for example, a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts) tert-butylhydroperoxide and formaldehyde sodium sulfoxylate. Further initiators that can be used are ammonium-, alkali- or earth alkali salts of permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of monomer to fluoropolymer of 70 to 80% is achieved. One can also add part of the initiator at the start and the remainder in one or separate additional portions during the polymerization. Preferred initiator systems include peroxodisulphate, permanganate and tert-butylhydroperoxide. Metal ions such as $Fe^{2+}$, $Ag^+$ etc. may be used in redox-systems, too.

The free radical polymerization may be carried out in an organic solvent. The polymerization may also be an aqueous suspension polymerization or an aqueous emulsion polymerization. An aqueous emulsion polymerization is preferred in the present invention.

The aqueous emulsion polymerization in the presence of above-mentioned initiators may be carried out at temperatures from 10 to 100° C., preferably 20 to 80° C. at a pressure from 2 to 25 bar, typically 3 to 20 bar.

For polymerization where the MV31 content is higher than 7 mol %, the aqueous emulsion polymerization is performed in the presence of a fluorinated surfactant, preferably a non-telogenic emulsifier, most preferably APFO. The emulsifier will generally be used in amounts less than 2% by weight, for example from 0.01 to 2% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid salt (APFO, described in U.S. Pat. No. 2,567,011), $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990). Still further emulsifiers than can be used include perfluoropolyethercarboxylate emulsifiers such as disclosed in EP 219 065.

The inventors found further, that with such a high amount of MV31, the liquid vinylether is most preferably pre-emulsified in water/fluoroemulsifier (as described in WO 01/49752), and in contrast to U.S. Pat. No. 6,380,337, the incorporation rate of MV31 is low or the polymerization time will be significantly longer. The pre-emulsified MV31 can be pre-charged, fed continuously during the polymerization into the kettle or both. Alternatively, MV31 is pre-emulsified and put into the kettle prior to the polymerization start-up. The weight ratio of the MV31 to water is less than 1:3, preferably less than 1:4. The average particle size of the pre-emulsion is from 100 nm to 3000 nm. A benefit of this procedure is that the polymerization runtimes are shorter compared to the procedure wherein an MV31 pre-emulsion is fed continuously.

If the MV31 amounts are lower than 7 mol %, surprisingly, the polymerization can be performed without the addition of fluorinated emulsifiers. Such polymerizations are described in WO 96/24622, WO 97/17381 and EP 56681/2, herein incorporated by reference in their entirety. The MV31 is generally fed as a hot aerosol into the polymerization kettle. This means that hot MV31 is fed through a spraying nozzle into the TFE, VDF-gas stream. Alternatively, MV31 can be fed into the kettle as superheated gas stream.

The polymerization system may comprise other auxiliaries, such as buffers, complex-formers and further chain transfer agents; preferred non-halogenated CTA's, especially for the emulsifier-free polymerizations, are ethane, pentane, dialkylethers such as dimethylether; methyl-tert-butylether.

The molecular weight of the fluoropolymer is not particularly limited. It is generally preferred that the molecular weight is in the range of 10,000 to 1,000,000. Bi/multimodal polymers having low and high-molecular weight portions with more or less the same co-monomer composition are prepared by procedures described in EP 56681/2. Preferred CTAs are in these cases dialkylethers.

The present fluoropolymers can also be prepared as core-shell materials. That means that the polymer compositions are different during the course of polymerization with the limitation that at least 50% by weight, preferably 70% by weight have the above-mentioned quad-composition. For example, one can start the polymerization by a typical VDF/HFP fluoropolymer composition and then switch to the desired quad-composition or vice versa. This procedure is especially useful at the end of polymerization to ensure an almost 100% utilization of the expensive MV31 and PMVE.

The fluoropolymer is preferably cured by the peroxide vulcanization methods using an organic peroxide and optionally further coagents. Other curing methods may be applied, as is known to one skilled in the art.

Suitable organic peroxides are those that generate free radicals at curing temperatures. A dialkyl peroxide or a bis(dialkyl peroxide), which decomposes at a temperature above 50° C., is especially preferred. In many cases it is preferred to use di-tertiarybutyl peroxide which has a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

Another component which is usually included in a cure composition based on an organic peroxide, is a coagent composed of a polyunsaturated compound, which is capable of cooperating with the peroxide to provide a useful cure. These coagents can be added in an amount equal to between about 0.1 to 10 parts per hundred parts fluoropolymer, preferably between 2 to 5 parts per hundred parts fluoropolymer. Examples of useful coagents include triallyl cyanurate; triallyl isocyanurate; triallyl trimellitate; tri (methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene) cyanurate. Particularly useful is triallyl isocyanurate. Other useful coagents include the bis-olefins disclosed in EP A0661304 A1, EPA0784064 A1 and EPA 0769521 A1.

As mentioned above, the fluoropolymer has improved bonding properties to other substrates, particularly in the presence of an organic compound having hydride functions MH. Additionally, by including this compound the fluoropolymer composition, a peroxide curable fluoropolymer composition can be obtained. Examples of the organic compound include siloxanes or silazenes that comprise one or more MH functions. Typically, when the organic compound is a siloxane or a silazene, the MH functions will be —SiH functions. Preferably, the SiH function will be an —OSiH whereby the hydrogen is attached to a silicon atom that is further bonded to an oxygen or nitrogen atom. The siloxane or silazene may be a simple low molecular weight organic compound or may be a polymeric compound including for example a polysiloxane which may be linear, branched or cyclic. Specific examples include HSi $(OCH_2CH_3)_3$, $(CH_3)_2(CH_3CH_2O)SiH$, 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydroxiloxane, 1,3,5-trimethyl cyclosiloxane and 1-phenyl-3,3,5,5-tetramethyl cyclosiloxane. Polysiloxanes and siloxanes having SiH groups are known in the art an can be produced according to well-known procedures such as disclosed in for example: Encyclopedia of Polymer Science and Engineering, Second Edition, V15, Silicones, pgs. 204–308, John Wiley & Sons, 1989. Siloxanes having SiH groups are also generally commercially available. Preferably, the siloxane or polysiloxane will have a molecular weight between 150 g/mol and 10,000 g/mol.

The organic compound may also be a compound that corresponds to the formula:

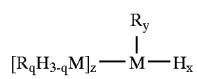 (I)

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, x and z represent a value of 0 to 3 and the sum of y+z=4−x. Examples of substituents that may be present on the hydrocarbon group R include alkoxy, aryloxy, halogens such as chlorine and bromine, nitrile groups, hydroxy groups and amino groups. The backbone of the hydrocarbon group may further be interrupted by one or more heteroatoms such as for example oxygen and nitrogen atoms. Typical examples of hydrocarbon groups include saturated or unsaturated linear, branched or cyclic aliphatic groups and aromatic groups. Specific examples are $C_1$–$C_5$ alkyl groups, aryl groups having 6 to 12 carbon atoms, arylalkyl and alkylaryl groups having 7 to 14 carbon atoms. Compounds of formula (I) above are known and have been described in for example J. Am. Chem. Soc., 116 (1994), page 4521–4522. Examples include tri(n-butyl)tin hydride, tri (ethyl)silyl hydride, di(trimethylsilyl)silylmethyl hydride, tri(trimethylsilyl)silyl hydride, tri(phenyl)silyl hydride. Compounds of formula (I) have further been disclosed in EP 761 735.

The curable fluoroelastomer composition may contain further additives, such as carbon black, stabilizers, plasticizers, lubricants, fillers, and processing aids typically utilized in fluoropolymer compounding, provided they have adequate stability for the intended service conditions.

The cure composition may further include an acid acceptor. Acid acceptors can be inorganic or blends of inorganic and organic acceptors. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

The curable fluoroelastomer compositions may be prepared by mixing the fluoropolymer, the cure composition and optionally the organic compound having hydride function(s) and other additives in conventional rubber processing equipment. Such equipment includes rubber mills, internal mixers, such as Banbury mixers, and mixing extruders.

The fluoropolymer may have desirable physical characteristics relating to $T_g$ and solvent resistance. The $T_g$ is about −25° C. or lower and preferably −27° C. and lower. The solvent resistance, as measured for 168 hrs, 23° C. and FUEL K (CM85) solvent, is about 60% or less and preferably 50% or less.

The invention is further illustrated with reference to the following examples, without however the intention to limit the invention thereto. All parts are by weight unless indicated otherwise.

EXAMPLES

| Materials Used | |
|---|---|
| Material | Description |
| VDF | Vinylidenedifluoride |
| TFE | Tetrafluoroethylene |
| BTFB | Bromotetrafluorobutene |
| TAIC | Triallylisocyanurate |
| PMVE | Perfluoromethylvinylether |
| MV31 | Perfluoromethyoxypropyl vinyl ether |
| FX 1006 | ammoniumperfluorooctanoate, commercially available from 3M Company of Saint Paul, MN |

Test Methods

The melt flow index (MFI) was carried out according to DIN 53735, ISO 12086 or ASTM D 1238-01. Unless otherwise noted, a support weight of 5.0 kg and a temperature of 265° C. was applied. The MFI's cited here were obtained with a standardized extrusion die of 2.1 mm diameter and a length of 8.0 mm.

Mooney viscosities were determined in accordance with ASTM D 1646-00. Unless otherwise noted, the Mooney viscosity was determined by using a 1 minute pre-heat and a 10 minute test at 121° C. (ML 1+10@121° C.).

Cure Rheology tests were run on uncured, compounded admixtures using an Alpha Technology Moving Die Rheometer (MDR) Model 2000 in accordance with ASTM D 5289-95 at 177° C., no preheat, 12 minutes elapsed time (unless otherwise specified) and a 0.5° arc. Minimum torque ($M_L$), Maximum torque ($M_H$), i.e., highest torque attained during specified period of time when no plateau or maximum was obtained and difference in Torque, ΔT, i.e., ($M_H$−$M_L$), were reported. Also reported were: $t_s2$ (time for torque to increase 2 units above $M_L$), t'50 (time for torque to reach $M_L$+0.5[$M_H$−$M_L$], and t'90 (time for torque to reach $M_L$+0.9 [$M_H$−$M_L$]).

Post cure samples were prepared by placing a press-cured sample in a circulating air oven. The oven was maintained at 232° C. and the samples treated for 16 hours.

Tensile Strength at Break, Elongation at Break, and Modulus at 100% Elongation were determined using ASTM D 412-98 on samples cut from 2.0 mm sheet with ASTM Die D. Units are reported in Mega Pascals (MPa).

Retraction at Lower Temperatures (TR-10) was determined using ASTM D 1329-88 (re-approved 1998) with ethanol as the cooling media. Units are reported in ° C.

Compression set determined by ASTM D 395-01 Method B with 0.139 inch (3.5 mm) O-rings compressed for 70 hours at 200° C. Results are reported as %.

Glass Transition Temperature was determined by ASTM E 1356-98 (re-approved 1995).

Unless otherwise noted, 150×75×2 mm press cured sheets were prepared for physical property testing by pressing at 5 to 7 MPa at 180° C. for 7 minutes. From these press cured sheets, the Tensile Strength at Break and the Elongation at Break were measured according to ASTM D 412-98. Hardness was determined according to ASTM D2240-02 Method A. Shore A durometer was used.

Melting peaks of the fluoropolymer were determined according to ASTM 4591 by means of Perkin-Elmer DSC 7.0 under nitrogen flow and a heating rate of 20° C./min.

The latex particle size determination was conducted by means of dynamic light scattering with a Malvern Zetazizer 1000 HSA in accordance to ISO/DIS 13321. Prior to the measurements, the polymer latexes as yielded from the polymerisations were diluted with 0.001 mol/L KCl-solution, the measurement temperature was 20° C. in all cases.

Solvent resistance or volume swell was determined with according to ASTM D 471-98 after immersing in CM85 (Fuel K fuel; 85% methanol, 7.5% iso-octane; 7.5% toluene by volume) and methanol at 23±2° C. for 70 hours or 168 hours. Fuel permeation constant was determined by the following method. A post cured sheet (press cure: 10 minutes at 177° C., post cure: 16 hours at 230° C.) was cut into a disc having a diameter of 7.72 cm and used for permeation testing. Permeation constants were obtained using the procedure described in ASTM D 814-95 (Reapproved 2000) with the following changes or specifics: The glass jar of ASTM D 814 was replaced with a Thwing-Albert Vapometer Permeability Cup as described in ASTM E 96-00; the gaskets used were made of Dyneon FE-5840Q elastomer (Shore A hardness of about 60) instead of neoprene rubber and were located on both the top and bottom of the test specimen; a circular disk of mesh screen was used on top of the gasket to prevent the test specimen from deforming during the test; the test liquid was 100 mL of CE 10 fuel (10% ethanol, 45% iso-octane; 45% toluene); and the test temperature was 40° C. The permeation constant (g-mm/m$^2$-day) was calculated by measuring the weight loss for a 30-day period using Mettler AT 400 at an accuracy of 0.1 mg. A slope of the line obtained by the least squares fit of weight loss (grams) versus time (days) was divided by the area of the test specimen and multiplied by its thickness.

Solution viscosity of diluted polymer solutions was determined on a 0.2% polymer solution in methylethylketone (MEK) at 35° C. in accordance to DIN 53726. A Cannon-Fenske, Routine-Viskosimeter (Fa. Schott, Mainz, Germany) fulfilling ISO/D/S 3105 and ASTM D2515 was used for measurements.

In the following examples, the compound compositions are based on 100 parts of rubber. The curatives and other additives are listed as parts per hundred parts of the rubber (phr). Where the amount of rubber was limited and a smaller batch size was made, the quantity of rubber used is noted, but the formulation is listed as if 100 parts were used to make comparisons easier. Percentages are weight % unless otherwise indicated.

Example 1

A polymerization kettle with a total volume of 47.5 L equipped with an impeller agitator system was charged with 29.0 L deionised water and was heated up to 70° C. The agitation system was set to 240 rpm and the oxygen free kettle was further charged with 11 g dimethylether, with 40 g MV31 monomer, with 428 g perfluormethylvinylether (PMVE) to 3.7 bar absolute, with 256 g vinylidenedifluoride (VDF) to 8.9 bar absolute and with 161 g tetrafluoroethylene (TFE) to 11.0 bar absolute reaction pressure. The polymerization was initiated by 130 g 30% APS solution (ammonium peroxodisulfate). As the reaction started, the reaction pressure of 11.0 bar absolute was maintained by the feeding TFE, PMVE and VDF into the gas phase with a feeding ratio PMVE (kg)/TFE (kg) of 1.07 and VDF (kg)/TFE (kg) of 1.68. The reaction temperature of 70° C. was also maintained. Additionally, a mixture consisting of 1985 g MV31 and 209 g bromotetrafluorobutene (BTFB) was fed as hot aerosol until 3040 g TFE feed was reached. When the feed of the MV31/BTFB mixture was completed, the agitation speed was reduced to 145 rpm. When 3380 g TFE feed was completed after 335 min the monomer valves were closed and the kettle head space monomer composition was reacted down to 5.5 bar within 10 min. The obtained polymer dispersion had a solid content of 34.9%, the latex particle diameter was 400 nm according to dynamic light scattering.

1000 ml of this polymer dispersion was coagulated by adding it drop-wise to an aqueous $MgCl_2$ solution with agitation, after which it was de-watered and washed three times with deionized water (60–70° C.). The polymer was dried overnight at 130° C. in an air circulating oven. The polymer shows no discernible melting transition and a glass transition temperature of –30.6° C. (midpoint value). The polymer had a MFI(265/5) of 17.3' and a solution viscosity of 63 ml/g. The polymer composition is: TFE 21 mol %, VDF 59 mol %, PMVE 15 mol %, MV31 4.3 mol % and BTFE 0.7 mol %.

The polymer and ingredients used in each composition were compounded on a two roll mill using standard methods. Triallylisocyanurate (TAIC) coagent (50% DLC, available as Perkalink™, 301-50 from Akzo Nobel Chemicals of Arnhern, The Netherlands), 2,5-dimethyl-2,5-di(t-butylperoxy)-hexane (45% DLC, available as Trigonox™ 101-45B from Akzo Nobel Chemicals of Arnhern, the Netherlands), zinc oxide (available as Zinc Oxide Aktiv from Bayer AG., Leverkusen, Germany), and MT N-990 (carbon black, available from J.P. Huber Corp. of Borgen, Tex.) were combined with the other ingredients. The compositions of the compounded gums are summarized in Table 1.

The cure rheology of the samples was investigated by testing uncured, compounded mixtures using the Alpha Technology Moving Disk Rheometer (MDR) Model and the procedure described in ASTM D 5289-95. The compound exhibited good curing properties. The other properties such as tensile strength, elongation, and compression set are summarized in Table 1. Also the solvent resistance or volume swell in CM85 at 23° C. for 168 hours are summarized in Table 1.

Example 2

Prior to the polymerization, 4550 g MV31 monomer was emulsified in 5350 ml deionised water together with 23 g perfluorooctanoate ammonium salt (APFO). For the emulsification, an Ultraturrax agitator was used first for 1 min at 24,000 rpm speed, which was followed by one pass in an Microfluidizer high shear homogenisator. This preemulsion had a turbid appearance and was stable for at least 12 h.

The same polymerization kettle as used for example 1 was again charged with 29.0 L deionised water and was heated up to 70° C. The agitation system was set to 240 rpm the oxygen free kettle was further charged with 5 g dimethylether, with 60 g MV31 monomer, with 680 g perfluormethylvinylether (PMVE) to 5.1 bar absolute, with 450 g vinylidenedifluoride (VDF) to 12.5 bar absolute and with 310 g tetrafluoroethylene (TFE) to 15.5 bar absolute reaction pressure. Prior to polymerization initiation, 2510 g PMVE was mixed with 210 g BTFB in a stainless steel cylinder. The polymerization was then initiated by 120 g 30% APS solution (ammonium peroxodisulfate). As the reaction started, the reaction pressure of 15.5 bar absolute was maintained by the feeding TFE, VDF as well as the mixture of PMVE and BTFE into the gas phase with a feeding ratio TFE (kg)/VDF (kg) of 0.53 and PMVE & BTFB (kg)/VDF (kg) of 0.52. The reaction temperature of 70° C. was also maintained. The preemulsified MV31 was charged into the kettle with a feeding ratio MV31 preemulsion (kg)/VDF (kg) of 0.66 until 4950 g VDF feed was reached (95% of target monomer feed). 5208 g VDF feed was completed after 145 min the monomer valves were closed. The so obtained polymer dispersion had a solid content of 34.7%, the latex particle diameter was 237 nm according to dynamic light scattering.

This polymer dispersion was worked up in the same way as the former example. The polymer shows no discernible melting transition and a glass transition at −32.0° C. (midpoint). The polymer had a MFI(265/5) of 2.4' and a solution viscosity of 81 ml/g. the composition: TFE 20 mol % VDF 59 mol % PMVE 11 mol % MV31 9.4 mol % BTFB 0.6 mol %. The polymer was compounded with ingredients as in Table 1 and the compound was tested as in Example 1.

Example 3 and 4

For examples 3 and 4, the fluoropolymer having the composition TFE 27 mol %, VDF 56 mol %, PMVE 15 mol %, MV31 1.5 mol %, BTFB 0.5 mol % was prepared according to the process described in Ex 1. The polymer had a $T_g$=−26° C.; and an MFI (265/5) of 11.4. The fluoropolymer in Ex 4 with the composition TFE 19 mol %, VDF 62 mol %, PMVE 10 mol %, MV31 8.3 mol %, BTFB 0.7 mol % was prepared according the procedure described in Ex 2. The polymer had a $T_g$=−33° C., Mooney viscosity ML 1+10/121° C. of 34, MFI (265/5 kg) of 26. The polymers were compounded with ingredients as in Table 1 and the compounds were tested as in Example 1.

Example 5

A 4 L kettle was charged 1600 g $H_2O$, 9 g ammonium oxalate, 1.6 g oxalic acid ($C_2H_2O_4$.2 $H_2O$); a preemulsion prepared from 500 g MV31 and 800 g $H_2O$ and 30 g of a 30% ammoniumperfluoroctanoate-solution (FX 1006, 3M Company, St. Paul, Minn.) with an Ultraturrax (24000 rpm). The kettle was further charged with 90 g TFE, 110 VDF, 20 g PMVE and 3.0 g bromotrifluoroethylene ("BTFE"). At 40° C., 12 bar pressure the polymerization was initiated by adding 20 ml of a 0.05% $KMnO_4$-solution. $KMnO_4$-solution was continuously fed over 2 hours (total consumption 0.041 g $KMnO_4$) and additionally 200 g TFE, 260 g VDF, 50 g PMVE and 5 g BTFE were added. The resulting latex had an solid content of 28%, the polymer had an composition of 28 mol % TFE, 54 mol % VDF, 3.6 mol % PMVE, 14 mol % MV31 and 0.4 mol % BTFE, Mooney viscosity ML 1+10/121° C.=130, MF/21.6 kg/265° C.=0.1 $T_g$=−38° C. The polymer was compounded with ingredients as in Table 1 the compound was tested as in Example 1.

Comparative Example 1

A fluoropolymer with the composition TFE 6.5 mol %, VDF 75 mol %, PMVE 18 mol % and 0.5 mol % BTFB was prepared in a similar way as described in Ex. 1. The polymer was compounded with ingredients as in Table 1 and the compound was tested as in Example 1.

Comparative Example 2

Ex 5 was repeated but without feeding any PMVE; the polymer had an composition of 32 mol % TFE, 53 mol % VDF, 14.6 mol % MV31 and 0.4 mol % BTFE, and an $T_g$ of −37° C.; additionally in the differential scanning calorimetry (DSC) analysis some slight crystalline peaks were observed from 50° C.–80° C., which made the polymer almost unusable for sealing application.

TABLE 1

Properties of cured Fluoropolymers

| | Ex. 1 | Ex. 2 | Comp. 1 | Ex. 3 | Ex. 4 | Ex. 5 | Ex. 6 |
|---|---|---|---|---|---|---|---|
| Compound formulation (phr) | | | | | | | |
| Ex 1 | 100 | | | | | | |
| Ex 2 | | 100 | | | | | |
| Comp. 1 | | | 100 | | | | |
| Ex 3 | | | | 100 | | | |
| Ex 4 | | | | | 100 | | |
| Ex 6 | | | | | | 100 | |
| Ex 5 | | | | | | | 100 |
| MT N-990 | 35.0 | 35.0 | 35.0 | 35.0 | 35 | 30 | 35 |
| ZnO | 5.0 | 5.0 | 5.0 | 5.0 | 5.0 | 3.5 | 4.0 |
| Perkalink ™ 301-50 | 4.0 | 4.0 | 3.5 | 4.0 | 4.0 | 3.5 | 4.0 |
| Trigonox ™ 101-45B | 2.0 | 2.0 | 2.5 | 2.0 | 2.0 | 2.5 | 2.0 |
| MDR at 180° C., 0.5° Arc, 100 cpm, 12 Minutes | | | | | | | |
| ML (dN-m) | 1.7 | 2.5 | | 1.9 | 1.5 | 2.6 | 5.0 |
| MH (dN-m) | 11.0 | 13.7 | | 11.5 | 9.8 | 11.6 | 19.9 |
| MH − ML (dN-m) | 9.3 | 11.2 | | 9.7 | 8.5 | 9.0 | 14.9 |
| TS 2, min | 0.6 | 0.6 | | 0.7 | 0.8 | 0.5 | 0.5 |
| t'50, min | 0.9 | 1.0 | | 1.0 | 1.2 | 0.7 | 0.7 |
| t'90, min | 3.6 | 4.3 | | 3.3 | 4.7 | 1.7 | 2.1 |
| Press Cure Time, 7 Min. 177° C., | | | | | | | |

TABLE 1-continued

Properties of cured Fluoropolymers

|  | Ex. 1 | Ex. 2 | Comp. 1 | Ex. 3 | Ex. 4 | Ex. 5 | Ex. 6 |
|---|---|---|---|---|---|---|---|
| Post cure Time, 16 h, 230° C. | | | | | | | |
| Hardness Share A2 | 67 | 68 | 72 | 71 | 66 | 60 | 75 |
| 100% Modulus (MPa) | 3.0 | 4.0 | 6.0 | 3.3 | 2.7 | 2.6 | 9.0 |
| Tensile (Mpa) | 11.6 | 12.5 | 11.7 | 11.0 | 9.8 | 13.3 | 15.4 |
| Elongation (%) | 260 | 230 | 275 | 340 | 280 | 280 | 140 |
| Compression Set, Method B (%) | 35 | 36 | 30 | 32 | 45 | 25 | 18 |
| Volume Swell, 168 h, 23° C. in CM85 (%) | 16 | 15 | 110 | 14 | 25 | 12 | 8 |

Example 6

A 4 L kettle charged with 800 g $H_2O$, a preemulsion of 600 g MV31 in 1800 g $H_2O$ and 30 g FX 1006, 50 g TFE, 95 g VDF, 10 g PMVE and 1.5 g BTFE was heated up to 40° C. The polymerization was initiated by adding 20 ml of 0.05% $KMnO_4$ solution. During 60 min. at 40° C., 12 bar pressure 80 g TFE, 160 g VDF, 20 g PMVE and 2.5 g BTFE was added; total $KMnO_4$ consumption: 0.043 g. The resulting latex had a solid content of 20%, particle size of 170 mm. The polymer composition was: 18 mol % TFE, 55% mol % VDF, 24 mol % MV31, 2.5 mol % PMVE and 0.3 mol % BTFE; the Mooney viscosity was 110, MFI 216 g/265° C.=10; $T_g$ –42° C. The polymer was compounded with ingredients as in Table 1 and the compound was tested as in Example 1.

Example 7

A 4 L kettle was charged with 1400 g $H_2O$, a preemulsion of 170 g MV31 in 400 g $H_2O$ and 15 g FX 1006, 40 g TFE, 80 g VDF, 6 g PMVE and 1.5 g BTFE. The polymerization was initiated with 20 ml of a 0.05% $KMnO_4$-solution. At 40° C. and 12 bar pressure 95 g TFE, 175 g VDF, 25 g PMVE, a preemulsion of 430 g MV31 in 800 g $H_2O$ and 15 g FX 1006, and 3 g BTFE were continuously added. After 140 min. the polymerization was stopped. The resulting latex had a solid content of 20%, particle size 200 mm. The polymer had essentially the same composition as Ex 6, Mooney viscosity 110, MFI 21.6 kg/265° C.=7 g/10 min; $T_g$=–42° C.

Example 8

In Example 8, the fluoropolymer having the composition TFE 20 mol %, VDF 59 mol %, PMVE 11 mol %, MV31 9.3 mol % and BTFB 0.7 mol %, was prepared according to the process described in Ex 2. The polymer had an $T_g$=–32° C.; Mooney viscosity ML 1+10/121° C. of 70 and an MFI(265/5) of 2.6. The fluoropolymer and ingredients used in each composition were compounded on a two roll mill using standard methods. Triallylisocyanurate (TAIC) coagent (72% DLC, available as TAIC DLC-A from Harwick Company, Akron, Ohio), 2,5-dimethyl-2,5-di(t-butylperoxy)-hexane (available as Varox DBPH-50 from R. T. Vanderbilt, Norwalk, Conn.), zinc oxide (available as UPS-1 from Zinc Corporation of America, Monaca, Pa.), and carbon black (available as Thermax MT, ASTM N990 from Cancarb Limited, Medicine Hat, Alberta, Canada) were combined with the other ingredients. The compositions of the compounded gums are summarized in Table 2.

The cure rheology of the samples was investigated by testing uncured, compounded mixtures using the Alpha Technology Moving Disk Rheometer (MDR) Model and the procedure described in ASTM D 5289-95. The compound exhibited good curing properties. The other properties such as tensile strength, elongation, and compression set are summarized in Table 2. Also the solvent resistance or volume swell in CM85 and methanol at 23° C. for 70 and 168 hours and CE10 (10% ethanol, 45% iso-octane; 45% toluene) permeation constant at 40° C. are summarized in Table 2.

Comparative Example 3

In Comparative Example 3, a peroxide curable fluoropolymer (available as Viton® GLT301 from DuPont Dow Elastomers LLC, Wilmington, Del.), which is a terpolymer, was used. The polymer has a composition of TFE 5 mol %, VDF 77 mol %, and PMVE 18 mol % by NMR analysis, and an $T_g$ of –30.4° C. Mooney viscosity ML 1+10/121° C. was 32. The fluoropolymer compound was prepared and tested as in Example 8. The compositions of the compounded gums and properties are summarized in Table 2.

TABLE 2

|  | Ex 8 | Comp. 3 |
|---|---|---|
| Compound formulation (phr) | | |
| Ex 8 | 100 | |
| Comp. 3 (Viton ® GLT305) | | 100 |
| N-990 | 30 | 30 |
| ZnO | 3 | 3 |
| TAIC (72% DLC) | 3.5 | 3.5 |
| Varox DBPH-50 | 2.5 | 2.5 |
| MDR at 177° C., 0.5° Arc, 100 cpm, 12 Minutes | | |
| ML (dN-m) | 0.6 | 1.1 |
| MH (dN-m) | 11.9 | 19.5 |
| MH – ML (dN-m) | 11.3 | 18.4 |
| TS 2, min | 0.7 | 0.4 |
| t'50, min | 1.1 | 0.6 |
| t'90, min | 4.5 | 2.2 |
| Press Cure Time, 10 Min. 177° C., Post cure Time, 16 h, 230° C. | | |
| Hardness Share A2 | 63 | 70 |
| 100% Modulus (MPa) | 2.9 | 5.8 |
| Tensile (MPa) | 14.8 | 22.9 |
| Elongation (%) | 246 | 213 |
| Compression Set, Method B (%) | 29 | 35 |
| Solvent resistance (volume swell at 23° C., %) | | |
| Solvent | time (hours) | | |
| CM85 (Fuel K) | 70 | 11 | 106 |
| Methanol/iso-octane/toluene = 85/7.5/7.5 vol %) | 168 | 15 | 104 |

TABLE 2-continued

|  | Ex 8 | Comp. 3 |
|---|---|---|
| 100% methanol | 70 | 9 | 105 |
|  | 168 | 11 | 112 |
| TR10 (° C.) |  | −32 | −29 |
| Permeation constant, CE10 at 40° C. (g-mm/m2-day) |  | 63 | 68 |

What is claimed is:

1. A fluoropolymer suitable for the preparation of a fluoroelastomer, said fluoropolymer comprising repeating units derived from:
   (a) 10 to 40 mol % of tetrafluoroethylene;
   (b) 40 to 65 mol % of vinylidene fluoride;
   (c) 1 to 30 mol % of a perfluorinated vinyl ether of the formula $CF_2\!\!=\!\!CFOCF_2CF_2CF_2OCF_3$; and
   (d) 1 to 20 mol % of perfluoromethyl vinylether.

2. The fluoropolymer of claim 1, wherein components (c) and (d) combined comprise at least 13 mol %.

3. The fluoropolymer of claim 1, wherein (c) is 7 to 30 mol % and (d) is 1 to 15 mol %.

4. The fluoropolymer of claim 3, wherein component (c) is pre-emulsified into a water based system containing a fluorinated surfactant.

5. The fluoropolymer of claim 4, wherein said fluorinated surfactant includes non-telogenic fluoroemulsifiers.

6. The fluoropolymer of claim 1, wherein (c) is 1 to 7 mol % and (d) is 10 to 20 mol %.

7. The fluoropolymer of claim 6, wherein component (c) is introduced into a polymerization system as a hot aerosol without any fluoroemulsifiers.

8. The fluoropolymer of claim 1, wherein said fluoropolymer has a bimodal or multimodal molecular weight.

9. The fluoropolymer of claim 1, further comprising a cure site monomer.

10. The fluoropolymer of claim 9, wherein said cure site monomer is 1-bromo-2,2-difluoroethylene ($CF_2\!\!=\!\!CHBr$, BDFE), 4-bromo-3,3,4,4-tetrafluorobutene-1 ($CH_2\!\!=\!\!CHCF_2CF_2Br$, BTFB), bromotrifluoroethylene ($CF_2\!\!=\!\!CFBr$, BTFE), 4-iodo-3,3,4,4-tetrafluorobutene-1 ($CH_2\!\!=\!\!CHCF_2CF_2I$, ITFB), perfluoro (2-bromoethyl vinyl ether) ($CF_2\!\!=\!\!CFOCF_2CF_2Br$, BEVE), perfluoro (3-iodopropyl viny ether) ($CF_2\!\!=\!\!CFO(CF_2)_3I$, or combinations thereof.

11. The fluoropolymer of claim 1, further comprising a chain transfer agent.

12. The fluoropolymer of claim 11, wherein iodine, bromine, or both are chemically bound to polymer chain ends using said chain transfer agent derived from one or more bromine or iodine of the formula:
   $R_fBr_x$ and $R_fI_x$ (Formula A) wherein $R_f$ is a X-valent fluoroalkylradical $C_1$–$C_{12}$, optionally containing chlorine atoms, while X is 1 or 2, or
   $RBr_nI_m$ (Formula B) wherein R represents a fluoro hydrocarbon, chlorofluoro hydrocarbon or a hydrocarbon and each of n and m is 0.1 or 2, or combinations thereof.

13. A fluoroelastomer comprising repeating units derived from:
   (a) 10 to 40 mol % of tetrafluoroethylene;
   (b) 40 to 65 mol % of vinylidene fluoride;
   (c) 1 to 30 mol % of a perfluorinated vinyl ether of the formula $CF_2\!\!=\!\!CFOCF_2CF_2CF_2OCF_3$; and
   (d) 1 to 20 mol % of perfluoromethyl vinylether.

14. A fluoroelastomer of claim 13, wherein components (c) and (d) combined comprise at least 13 mol %.

15. The fluoroelastomer of claim 13, wherein (c) is 7 to 30 mol % and (d) is 1 to 15 mol %.

16. The fluoroelastomer of claim 13, wherein (c) is 1 to 7 mol % and (d) is 10 to 20 mol %.

17. The fluoroelastomer of claim 13, wherein said fluoroelastomer has a $T_g$ of about −25° C. or lower.

18. The fluoroelastomer of claim 13, wherein said fluorerlastomer has a solvent swell according to ASTM D471-98 in FUEL K (CM85) of about 60% or less.

19. The fluoroelastomer of claim 13, wherein said cure composition is a peroxide cure composition containing brominated units, iodinated units, or combinations thereof.

20. The fluoroelestomer of claim 13, further comprising a cure site.

21. The fluoroelastomer of claim 20, wherein said cure site is derived from 1-bromo-2,2-difluoroethylene ($CF_2\!\!=\!\!CHBr$, BDFE), 4-bromo-3,3,4,4-tetrafluorobutene-1 ($CH_2\!\!=\!\!CHCF_2CF_2Br$, BTFB), bromotrifluoroethylene ($CF_2\!\!=\!\!CFBr$, BTFE), 4-iodo-3,3,4,4-tetrafluorobutene-1 ($CH_2\!\!=\!\!CHCF_2CF_2I$, ITFB), perfluoro (2-bromoethyl vinyl ether) ($CF_2\!\!=\!\!CFOCF_2CF_2Br$, BEVE), perfluoro (3-iodopropyl viny ether) ($CF_2\!\!=\!\!CFO(CF_2)_3I$, or combinations thereof.

22. The fluroelastomer of claim 13, further comprising a functional end group.

23. The fluoroelastomer of claim 22, wherein said functional end group is derived from one or more bromine or iodine of the formula:
   $R_fBr_x$ and $R_fI_x$ (Formula A) wherein $R_f$ is a X-valent fluoroalkylradical $C_1$–$C_{12}$, optionally containing chlorine atoms, while X is 1 or 2, or
   $RBr_nI_m$ (Formula B) wherein R represents a fluoro hydrocarbon, chlorofluoro hydrocarbon or a hydrocarbon and each of n and m is 0.1 or 2, or combinations thereof.

24. A fluoroelastomer composition comprising repeating units derived from:
   (a) 10 to 40 mol % of tetrafluoroethylene;
   (b) 40 to 65 mol % of vinylidene fluoride;
   (c) 1 to 30 mol % of a perfluorinated vinyl ether of the formula $CF_2\!\!=\!\!CFOCF_2CF_2CF_2OCF_3$; and
   (d) 1 to 20 mol % of perfluoromethyl vinylether, wherein components (c) and (d) combined comprise at least about 13 mol % and said fluoroelastomer has a $T_g$ of about −25° C. or lower.

25. The fluoroelastomer of claim 24, wherein said fluorerlastomer has a solvent swell according to ASTM D471-98 in FUEL K (CM85) of about 60% or less.

26. A method of making a fluoropolymer as defined in claim 1, comprising free radical polymerization of tetrafluoroethylene, vinylidene fluoride, a perfluorinated vinyl ether of the formula $CF_2\!\!=\!\!CFOCF_2CF_2CF_2OCF_3$, and perfluoromethyl vinylether in amounts appropriate so as to obtain a fluoropolymer having the composition as defined in claim 1.

27. The method of claim 26, wherein the free radical polymerization is an aqueous suspension polymerization or aqueous emulsion polymerization.

28. The method of claim 26, wherein the perfluorinated vinyl ether is pre-emulsified and added before polymerization.

29. The method of claim 26, wherein said fluoropolymer is prepared as a core-shell material.

30. The method of claim 26, wherein said polymerization is performed in the presence of I or Br salts.

31. The method of claim 26, wherein the fluoropolymer further comprises a cure site monomer.

32. The method of claim 31, wherein said cure site monomer is 1-bromo-2,2-difluoroethylene ($CF_2$=CHBr, BDFE), 4-bromo-3,3,4,4-tetrafluorobutene-1 ($CH_2$=CHCF$_2$CF$_2$Br, BTFB), bromotrifluoroethylene ($CF_2$=CFBr, BTFE), 4-iodo-3,3,4,4-tetrafluorobutene-1 ($CH_2$=CHCF$_2$CF$_2$I, ITFB), perfluoro (2-bromoethyl vinyl ether) ($CF_2$=CFOCF$_2$CF$_2$Br, BEVE), perfluoro (3-iodopropyl viny ether) ($CF_2$=CFO(CF$_2$)$_3$I, or combinations thereof.

33. The method of claim 26, wherein the fluoropolymer further comprises a chain transfer agent.

34. The method of claim 33, wherein iodine, bromine, or both are chemically bound to polymer chain ends using said chain transfer agent derived from one or more bromine or iodine of the formula:

$R_fBr_x$ and $R_fI_x$ (Formula A) wherein $R_f$ is a X-valent fluoroalkylradical $C_1$–$C_{12}$, optionally containing chlorine atoms, while X is 1 or 2, or $RBr_nI_m$ (Formula B) wherein R represents a fluoro hydrocarbon, chlorofluoro hydrocarbon or a hydrocarbon and each of n and m is 0.1 or 2, or combinations thereof.

35. A method for forming a fluoroelastomer comprising vulcanizing the fluoropolymer of claim 1 with a cure composition.

36. A method according to claim 35, wherein an organic peroxide is utilized for vulcanization of said fluoropolymer.

* * * * *

UNITED STATES PATENT AND TRADEMARK OFFICE
CERTIFICATE OF CORRECTION

PATENT NO. : 6,864,336 B2
DATED : March 8, 2005
INVENTOR(S) : Kaspar, Harald

It is certified that error appears in the above-identified patent and that said Letters Patent is hereby corrected as shown below:

Column 5,
Line 2, "$Fe^2+$," should be shown as -- $Fe^{2+,}$ --

Column 9,
Line 61, "perfluormethylvinylether" should be shown as -- perfluoromethyl vinylether --

Column 10,
Line 64, "perfluormethylvinylether" should be shown as -- perfluoromethyl vinylether --

Column 12,
Line 6, "ammoniumperfluorooctanoate" should be shown as -- ammonium perfluorooctanoate --

Column 13,
Line 28, "216 g" should be shown as -- 21.6 g --

Signed and Sealed this

Seventh Day of June, 2005

JON W. DUDAS
*Director of the United States Patent and Trademark Office*